(12) United States Patent
Francalanci et al.

(10) Patent No.: US 7,640,018 B2
(45) Date of Patent: Dec. 29, 2009

(54) METHOD, SYSTEM AND COMPUTER PROGRAM PRODUCT FOR DETERMINING THE CELL AREA OF A BASE STATION BY TAKING INTO ACCOUNT PIXEL OF TERRITORY SPECIFIC QUANTITY OF TRAFFIC, AND NETWORK PLANNED USING THIS METHOD

(75) Inventors: Indro Francalanci, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 227 days.

(21) Appl. No.: 10/578,502
(22) PCT Filed: Nov. 7, 2003
(86) PCT No.: PCT/IT03/00725
   § 371 (c)(1),
   (2), (4) Date: May 5, 2006
(87) PCT Pub. No.: WO2005/046276
   PCT Pub. Date: May 19, 2005

(65) Prior Publication Data
   US 2007/0037579 A1    Feb. 15, 2007

(51) Int. Cl.
   *H04W 36/00* (2009.01)
(52) U.S. Cl. ...................... 455/446; 715/969
(58) Field of Classification Search ............. 455/466, 455/453
   See application file for complete search history.

(56) References Cited

U.S. PATENT DOCUMENTS 6,094,580 A    7/2000 Yu et al.

FOREIGN PATENT DOCUMENTS

EP     1 414 257 A1    4/2004

WO    WO-02/35872 A1    5/2002

OTHER PUBLICATIONS

Erkkilaitinen; "Optimization of GOS of Cellular Network"; IEEE, vol. 5, pp. 2277-2281, (2002).
Menolascino et al.; "STORMS: Software Tools for the Optimisation of Resources in Mobile Systems"; Project No. AC016, pp. i-vi, viii and 1-58, (1994).
"$3^{RD}$ Generation Partnership Project; Technical Specification Group Radio Access Networks; Radio Frequency (RF) System Scenarios (Release 6)"; 3GPP TR 25.942 V6.0.0, pp. 1-121, (2002).

*Primary Examiner*—Rafael Pérez-Gitoérrez
*Assistant Examiner*—Marcos Batista
(74) *Attorney, Agent, or Firm*—Finnegan, Henderson, Farabow, Garrett & Dunner, L.L.P.

(57) ABSTRACT

A method for planning a telecommunication network for radio apparatuses includes a plurality of cells distributed over a geographical area, each of which has a set of elementary areas of territory called pixels adapted to receive a radio signal irradiated by a fixed radio base station in which for each cell is determined a service area of the location of the pixels of the cell in which the network is able to provide predetermined services to the mobile apparatuses located therein. The pixels belonging to the service area pertaining to a predetermined cell are identified according to a criterion for selection in succession based on the values of a sorting function, which is a function of the quantity of traffic pertaining to the pixels being examined, and the resulting service area is computed as a set of the pixels of the cell progressively selected in a manner that the sum of the contributions of the individual pixel does not exceed a predetermined limit value of the load factor of the cell. A computing system and a computing program or group of programs executable by the system and adapted to implement the method.

12 Claims, 5 Drawing Sheets

METHOD, SYSTEM AND COMPUTER PROGRAM PRODUCT FOR DETERMINING THE CELL AREA OF A BASE STATION BY TAKING INTO ACCOUNT PIXEL OF TERRITORY SPECIFIC QUANTITY OF TRAFFIC, AND NETWORK PLANNED USING THIS METHOD

CROSS REFERENCE TO RELATED APPLICATION

This application is a national phase application based on PCT/IT2003/000725, filed Nov. 7, 2003, the content of which is incorporated herein by reference.

FIELD OF THE INVENTION

The present invention generally relates to the planning of a telecommunication network for radio apparatuses that use CDMA (Code Division Multiple Access) techniques, and more specifically it relates to a method and a system for planning a telecommunication network for mobile apparatuses including a plurality of cells distributed over a geographical area, each of which comprises a set of elementary areas of territory adapted to receive a radio signal irradiated by a fixed radio base station.

In particular, the present invention relates to a method for planning a telecommunication network, as well as a processing system and a processing program or group of programs for implementing the aforesaid method.

PRIOR ART

Telecommunication networks for mobile apparatuses of the cellular type are characterised by the subdivision of the geographical area of coverage into a plurality of cells, each of which is defined as the set of elementary areas (pixels) of territory served by the radio-electric signal irradiated by the antenna of a fixed radio base station.

Telecommunication networks for third generation UMTS (Universal Mobile Telecommunications System) mobile terminals employ, as is well known, a radio interface based on the CDMA (Code Division Multiple Access) technique.

Among known cellular networks, those using the CDMA access technique have the peculiarity that a same frequency band (channel) can be used in the various cells, so that the passage of a mobile terminal from a cell to a contiguous one (handover) can be managed using the same frequency. Such techniques are known as "soft handover".

According to the "soft handover" mechanism, in particular zones, called soft handover or macro-diversity zones, a mobile terminal (mobile) is able to decode the signals of multiple antennas, and hence to exchange information with multiple Radio Base Stations (RBS).

The identification of the macro-diversity zones and their dimensioning has considerable importance for the correct operation and dimensioning of cell apparatuses in a telecommunication network, since a macro-diversity mobile takes up resources of all the Radio Base Stations whereto it is simultaneously connected.

An additional peculiarity of UMTS networks consists of the fact that such networks are able to provide a plurality of services, such as:
Telephony;
Fax;
Videotelephony;
Internet access, and that each of said services generally has specific characteristics in terms of speed (number of bits per second) and traffic (quantity, symmetrical or asymmetrical).

It follows that, in planning a network, cell dimensioning must jointly take into account the characteristics of each service and of any groupings of services on a single radio carrier as specified in accordance with the CDMA access technique.

Therefore, the planning of UMTS networks, due its peculiarities, is a complex activity that requires substantially different approaches from those used heretofore for cellular networks known as GSM (Global System for Mobile Communication) or IS95 (Interim Standard).

Known methods for planning UMTS networks can be grouped, depending on the approach, into two distinct families: "statistical" methods and "deterministic" methods.

Statistical methods are mainly based on a Montecarlo type of approach (see, as a reference, 3GPP TR 25.942 v6.0.0 2002-12—"RF System Scenarios—Release 6").

The "Montecarlo simulation" is usually used to indicate a static simulation composed by a series of independently statistically snapshots. Once the scenario to be studied is fixed, each snapshot consists of a series of steps that simulate the behaviour of the network to be examined and ends with the statistical analysis of the user distribution being considered. The simulation is structured in successive snapshots, whose number must obviously be sufficient to guarantee the statistical stability of the results.

This is quite a specific methodology, particularly suitable to examine the performance of a UMTS network with small geographic extension, but, due to an intrinsic "slowness" of the model, is cannot be extended to the treatment of UMTS networks whose geographical areas are comparable with national ones.

Deterministic methods maintain some static analysis characteristic, but systematically consider all the pixels in a single snapshot of the territory whereon the network stands, and are clearly more suitable for planning UMTS mobile networks relating to very extensive geographical areas, although the result generally has lower levels of adherence to the evolving reality.

In this regard, in the art are already known systems and methods for planning networks for mobile apparatuses that use the CDMA access technique.

For example, the document AC016/CSE/MRM/DR/P/091/a1 with the title "STORMS Project Final Report", April 1999, describes a method and a system devised within the STORMS project (Software Tools for the Optimisation of Resources in Mobile Systems) promoted by the European Commission. However, the implemented method was slow, and is incapable of providing information on the macro-diversity areas, one of the most important and difficult to manage aspects for an operator providing third generation network services.

The patent application WO 02/35872 by the same applicant described an alternative deterministic planning method that takes the macro-diversity areas into account.

In particular, in WO 02/35872 the process for planning an UMTS network is subdivided into steps which are briefly recalled below:

Calculation of Electromagnetic Coverage Areas

The dimensions and characteristics of each coverage area are estimated, i.e. the location of the elementary areas of territory or pixel in which the radio-electrical signal irradiated by a fixed radio station is received within a predetermined radius (for example 80 Km) is estimated.

Calculation/Forecast of the Traffic Distribution Over the Territory

The traffic offered to the network is estimated, for each service for elementary area (pixel) according to different approaches, for example exploiting existing reference information such as GSM voice traffic measurements, or estimating traffic values pixel by pixel according to information provided by a marketing department.

Domain Calculation

The domain calculation step allows to calculate, within each coverage area, using realistic propagation models relating to the area in consideration, the location of the pixels where the radio-electric signal can be decoded by a mobile terminal in the presence of thermal noise alone.

Domain calculation is specific for UMTS networks and for the downlink segment (from radio base station to mobile), and it is conducted taking as a reference the family of services with the least stringent limits, i.e. that service or family of services that requires the lowest value of power received by a mobile terminal to decode the radio-electric signal.

Service Area Calculation

When planning and dimensioning the network, the step of calculating the service areas, exploiting traffic information and domain information, allows to dimension "the service area" of each cell, i.e. the set of pixels in which it is actually possible to provide the Service or the set of UMTS services grouped on a single radio carrier (family of Services).

Service areas are exclusive, in the sense that each pixel belongs to a single service area, and may not be more extensive than the respective domain.

The calculation, based on the "uplink" segment (from mobile to radio base station), is performed determining the load factor $\eta$ of the cell, i.e. the ratio between the load of the cell to be accepted and the maximum load in correspondence with which the system is in unstable conditions.

The calculation for identifying the service area is carried out, cell by cell, starting from the pixel that is electromagnetically "closest" to the radio base station (i.e. the one the lowest link attenuation) and proceeding "moving away" towards pixels with higher attenuation, aggregating the pixels as they are selected.

In particular, the calculation is made for each domain and in contention with other domains, the trajectory for selecting the pixels to be inserted in the service areas is determined by the attenuation values calculated in the domains, and the traffic contributions of the various pixels for the calculation of $\eta$ are determined by the traffic values calculated as stated above.

Calculation of Macro-diversity Areas

Lastly, in this step is identified the location of the pixels in which a mobile terminal is able to decode the signal coming from multiple Radio Base Stations. For each service area are analysed the pixels that are external to the service area, but internal to the corresponding domain and the verification is made as to whether said pixels can be "served" in macro-diversity.

Verification of Outage Areas for Low Values of the C/S (Signal/Interference) Ratio A final step for refining the planning process, which correctly considers the intracell and intercell interference effects that in the previous steps were estimated with a simplified methodology, allows to compensate for any approximations introduced during the previous steps and to verify the presence of any areas of unavailability to proceed with the detailed definition of the equipment to be installed.

The performance of a CDMA wide area network also depends on the time sequence of user activation, which aspect is not considered in the prior art.

In particular, in WO 02/35872, in the process of computing the service area relating to a determined cell, the order with which the various pixels of the domain are considered is established only as a function of the value of electromagnetic attenuation, moving from the lower to the higher values, and iteratively adding the traffic contributions of the various pixels to the cell load factor $\eta$, until it reaches a predetermined limit $\eta_{lim}$ (typically equal to 0.6-0.7) or until there are no more pixels in the domain.

This mechanism is in line with the characteristics of the CDMA technique, which tends to minimise the powers transmitted by the mobiles, but does not take into account the time-dependant characteristics of the phenomenon (variable traffic) and therefore does not reflect the actual operation of the UMTS network.

The Applicant has observed that if a pixel is characterised by low attenuation, but it has very low offered traffic, within a determined period of time taken as a reference (BH: also known as Busy Hour), the probability that it may require resources from the cell is quite limited; vice versa, if the pixel is characterised by a high value of offered traffic, the probability that it may require resources from the cell, also in the same time frame BH, is far greater, even if the pixel has a high attenuation level.

Hence, in the actual operation of the network, considered also in its evolution over time, pixels with high offered traffic levels tend to be the first, on average, to grab the resources of the cell, thereby modifying in this sense the shape of the service area and hence all the performance that depends thereon.

The order of consideration of the pixels established according to electromagnetic attenuation alone, therefore, does not take into account the actual evolution of traffic in the network.

SUMMARY OF THE INVENTION

An object of the present invention is to provide a method and a system for planning a telecommunication network for radio apparatuses which does not have the limitations of the prior art as described above, i.e. which, in computing the service areas of the individual cells of the network takes into account the time-related characteristics of activation of the users.

According to the present invention said object is achieved thanks to a method for planning a telecommunication network and a system having the characteristics set out in the independent claims.

Another object of the present invention is a telecommunication network for radio apparatuses that is planned by means of the method of the present invention.

A further object of the present invention is a computer product or set of computer products able to be executed by an electronic computer or by a set of electronic computers as claimed.

Reference to a set of computer products is clearly meant to highlight the possibility for the invention to be implemented in decentralised fashion on a plurality of electronic computers.

Briefly, the present invention is based on the principle of adopting a pixel selection sequence which depends at least on the quantity of traffic pertaining to the pixels which can potentially be served by the cell being examined. The innovative criteria for selecting the pixels which contribute to the calculation of the cell load factor can be used in the evaluation of the service areas and/or of the outage areas in a process for planning a cellular telecommunication network.

This innovative manner of selecting the pixels allows to introduce into the planning process an element that is closely dependent on the time evolution characteristics of the behaviour of a CDMA or UMTS network, in turn connected to the probability of request for service activated by the individual pixels, with the effect of obtaining a planning of the service area that is much closer to the actual behaviour of the telecommunication network.

The effect thereby obtain also assures that the results of the planning process thus implemented approach those achievable, for instance, with a Montecarlo method which requires a sufficient number of snapshots able to guarantee the statistical stability of the results and high processing times.

BRIEF DESCRIPTION OF THE DRAWINGS

Further advantages and characteristics of the present invention shall become more readily apparent from the detailed description that follows, provided purely by way of non limiting example with reference to the accompanying drawings, in which.

DETAILED DESCRIPTION OF THE INVENTION

Figure 2:
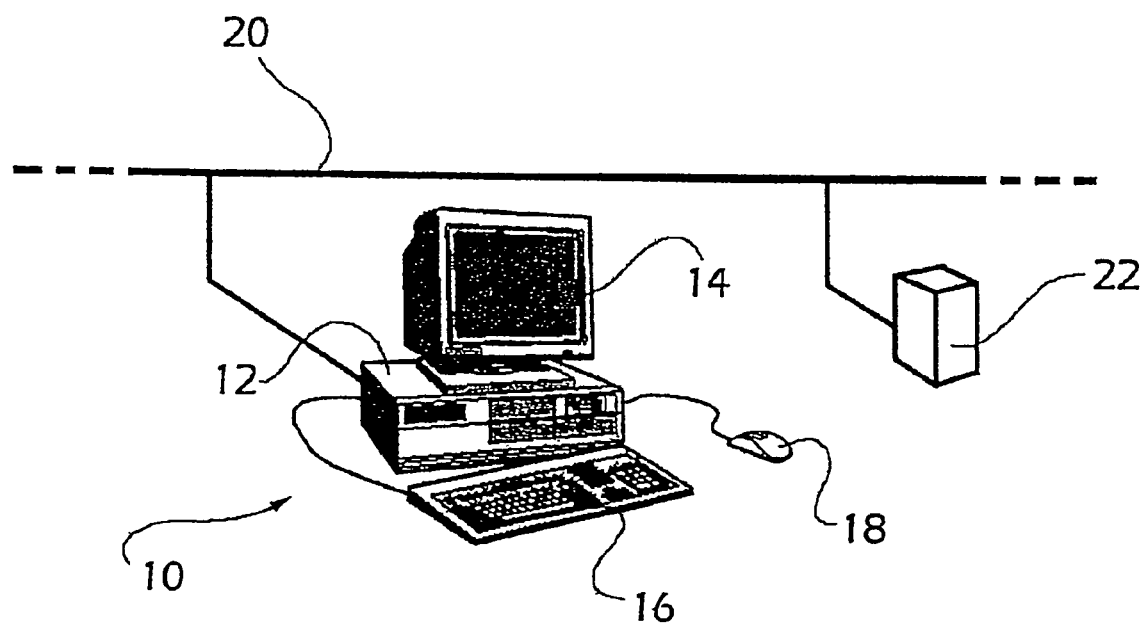
FIG. 2 is a simplified diagram of a system for planning a telecommunication network for mobile apparatuses according to the invention.

With reference to FIG. 2, the essential lines are illustrated of a system for planning a telecommunication network for mobile apparatuses or terminals (hereinafter, for the sake of brevity, simply mobiles). It comprises, for example, a known computerised workstation 10, having a processing subsystem (base module) 12, a display 14, a keyboard 16, a mouse 18 and a device for connection to a local network (network bus) 20.

As a workstation 10, for instance, the model J6700 by Hewlett-Packard can be used, for a 750 MHz CPU, a 10 Gbyte RAM, a 70 GByte internal hard disk unit and a UNIX operating system.

The workstation is capable of processing groups or modules of programs stored on disk or accessible on the network, and of displaying the results on the display 14. The groups or modules of programs are processing and computing programs that implement the method according to the invention, as shall be described in detail below.

The system according to the invention further comprises a known sub-system of disks 22, connected by means of the network connection 20 to the workstation 10 and able to contain stored reference databases, as shall be described in detail below, with reference to the implementation of the method according to the invention.

Naturally, the databases can also be stored, if they have limited dimensions, in the disk drive of the workstation 10 without thereby changing the characteristics of the invention. Moreover, the system can be enabled for connection to other peripheral input/output devices, local or remove, or it may consist of a distributed processing system, but the solutions mentioned herein are considered well known in the art and will not be further described herein because they are not relevant in themselves for purposes of implementing and understanding the present invention.

In general, the system in the configuration described herein or in other equivalent configurations is adapted for planning and dimensioning a telecommunication network for mobile terminals on the basis of programs or groups of programs (modules) implemented for the execution of the method according to the invention and with the aid of the databases stored in the disk subsystem 22.

Figure 1:
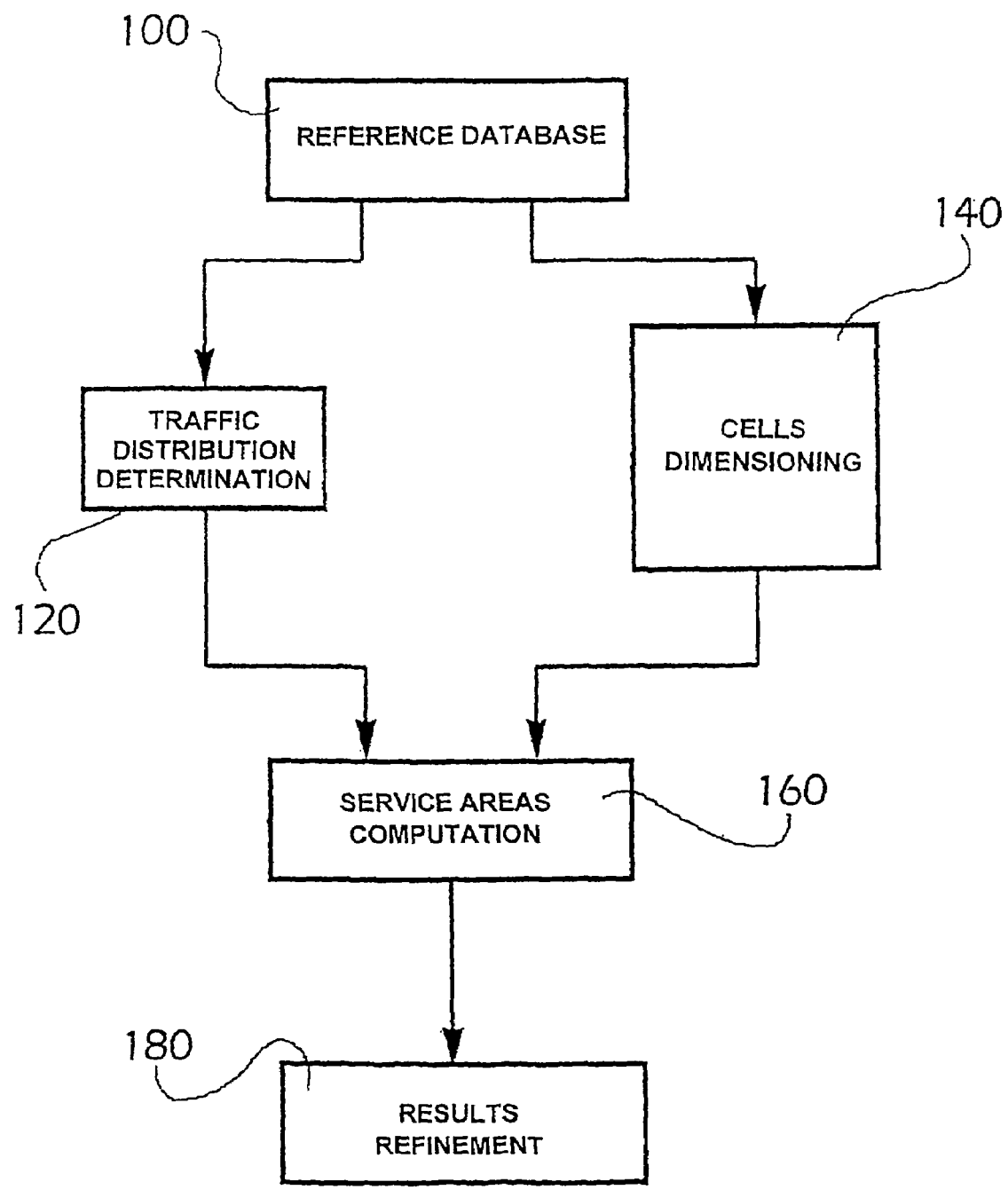
FIG. 1 is a simplified flow chart of a general deterministic method for planning a telecommunication network for mobile apparatuses according to the prior art.

With reference to FIG. 1, a general deterministic method for planning a telecommunication network for mobile apparatuses according to the prior art is recalled.

Starting from reference databases, for instance geographic and demographic databases already present or updated, whereto the system has access at step 100, the system determines—by computation or estimate—the distribution of traffic over the territory at step 120 and calculates the dimensions of each cell (coverage) according to the positioning of the Radio Base Stations and of the theoretical propagation models at step 140.

Combining the information on the traffic distribution computed/estimated at step 120 and on the coverage computed at step 140, at step 160 the system computes the "service areas", i.e. the location of the elementary areas of each cell in which the network is able to provide predetermined services available on the network to the mobile apparatuses located therein.

At step 180, lastly, the system refines the results obtained and evaluates the performance of the network thus dimensioned.

Figure 3:
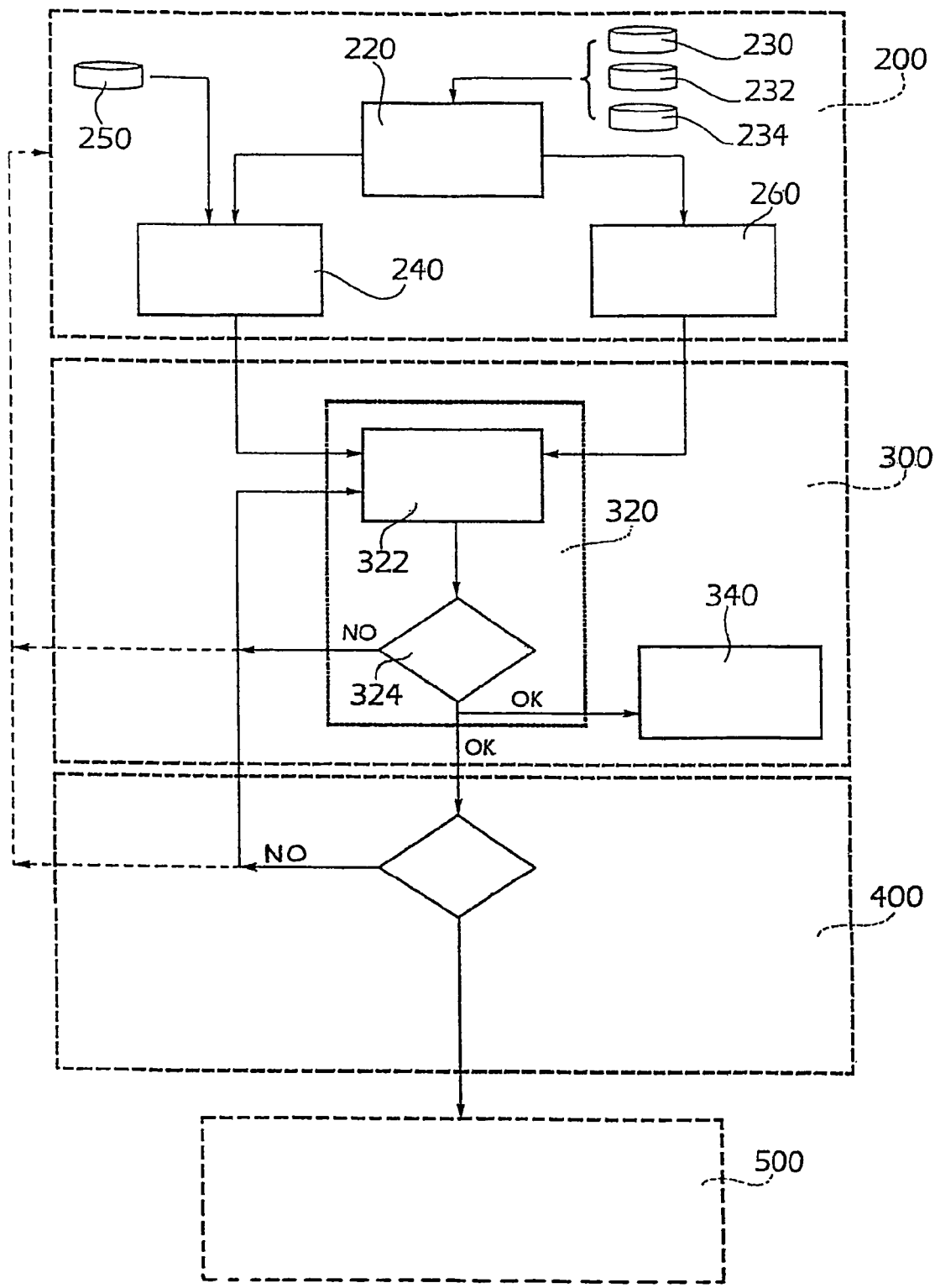
FIG. 3 is a flow chart of the method for planning a telecommunication network for mobile apparatuses according to the invention, and FIGS. 4*a* and 4*b* schematically show the criteria for selecting the pixels in the calculation of the service areas, respectively according to the prior art and according to the invention.

The method for identifying the service area is innovative and described below with reference to FIGS. 3, 4*a* and 4*b*. Purely by way of example, the present invention shall be applied to a planning method described in detail below with reference to FIG. 3 and known from WO 02/35872, but naturally it can find application in any other deterministic network planning method as per FIG. 1.

The preferred planning method essentially comprises a plurality of steps which can be grouped in four logic blocks:

A first block 200 for preparing the data required for network planning;

A second block 300 for planning and dimensioning the network based on the radio link from a mobile terminal to the Radio Base Station ("uplink");

A third block 400 for verifying the dimensioning performed at block 300; and A fourth block 500 for refining network planning and dimensioning based on the radio link from the Radio Base Station to the mobile terminals ("downlink").

The first block 200 comprises the operations of computing the cell coverage areas (at step 220), of computing of forecasting traffic distribution over the territory (at step 240) and of computing the cell domains (at step 260), as mentioned in the introductory part of this description.

In detail, at step 220 the dimensions and characteristics of each coverage are computed, i.e. the location of the elementary areas of territory or pixels in which the radio-electrical signal irradiated by the Radio Base Station is received within a predetermined radius (for instance 80 km) according to geographic databases 230, urbanisation and territory morphology databases 232, and to the radio-electric characteristics of the Radio Base Stations 234.

Processing by the system is automatic and the system is able to present in graphic form the results of the computation on the display 14 of the workstation 10.

At step 240 the traffic offered for each service for each elementary area (pixel) on the basis of a traffic database 250. To adapt scenarios with different families of services, it was convenient to define a relationship that, for each pixel, assigns an equivalent traffic value as an analytical function of multiple variables, such as the values of traffic intensity for each service and of the related radio characteristics (BitRate, SAF (Service Activity Factor), Eb/No ratio, etc.).

For the purposes of the present invention, the equivalent offered traffic $T_{m,n}$ present on the pixel m,n of the geographical area can be computed, for instance, as:

$$T_{m,n} = \frac{1}{B_0} \sum_{i=0}^{S-1} B_i \cdot T_{m,n,i}$$

where:
S is the total number of services, $B_0$ is the Bit rate of the service with the lowest speed, $B_i$ is the Bit Rate of the $i^{th}$ service present in the pixel m,n and $T_{m,n,i}$ is the traffic offered in the pixel m,n for the $i^{th}$ service. The example is limited to the single-channel case, but it can be extended to the case of multiple channels.

Naturally, a person versed in the art may propose other formulas for computing the equivalent traffic, suitable for the purpose, without thereby departing from the scope of the present invention.

At step 260, employing the propagation models relevant to the geographical area to be considered, the domains are computed within each coverage area, i.e. the location of the pixels in which the radio-electrical signal can be decoded by a mobile terminal in the presence of thermal noise alone. In particular, the domain of each cell is computed verifying for each pixel of the coverage whether the radio-electrical signal is received with a higher power than the threshold determined according to the less stringent service. Domains are not mutually exclusive and there will be intersection regions containing pixels that belong to more than one domain.

Processing by the system is automatic and the system is able to present the results of the computation in graphic form on the display 14 of the workstation 10.

The block 300 comprises the operations of computing the service areas (at step 320) and computing the macro-diversity areas (at step 340).

The computation for identifying the service areas 320 is performed in two steps, a first step 322 of actually computing the areas and a second step 324 of checking to verify outage areas due to the limited power of the mobile or to verify the power of the radio base station.

The computation is performed using the well known "Pole Capacity" equation recalled below, whereby the load factor $\eta$ of a cell is determined, i.e. the ratio between the cell load to be accepted and the maximum load (also called "pole capacity"), in correspondence with which the system is in unstable conditions.

The load factor $\eta$ of a cell is given by:

$$\eta = \sum_{i=1}^{S} n_i \cdot SAF_i \cdot (1 + f_i) \cdot SNR_i$$

where:
S is the total number of services;
$n_i$ is the maximum number of users simultaneously active in the cell for the $i^{th}$ service and it is determined according to the traffic computed adding the individual traffic contributions $T_{m,n}$ of the pixels aggregated according to the predetermined sorting criteria until that moment;
$SAF_i$ is the Service Activity Factor (i.e. the percentage of time occupation of the channel) of the $i^{th}$ service and it is estimated a priori with typical values, for example for the telephony service it is 0.5;
$f_i$ is the ratio between intracell interference and intercell interference and it is estimated a priori and subsequently verified; and
$SNR_i$ is the signal to noise ratio required for the $i^{th}$ service and it has typical values for each service.

The computation of the service areas is performed, cell by cell, adding the traffic contributions of the various pixels to the total load factor of the cell (contributions determined by the traffic values computed as recalled at step 240), until it reaches a pre-set limit $\eta_{lim}$ (typically equal to 0.6-0.7) or until there are no more pixels in the domain.

According to a preferred embodiment, the present invention implements a method for computing the service area which provides for the use of a "sorting variable" which depends on the traffic present in the pixel.

In particular, in accordance with the present invention, a method is defined which takes into account, for example, of the equivalent traffic of each pixel in determining the order of consideration of the various pixels in the summation defined previously to verify whether or not the pixel and the corresponding traffic offered belong to the service area of the cell being examined.

In order to define this method, the "sorting variable" introduced is the value of a function of one or more variables—for instance attenuation and offered traffic—for each individual pixel, to replace or complement the attenuation value alone.

One of the possible formulations of sorting variable $R_{m,n}$ hypothesised as a function of 2 variables $R_{m,n} = R_{m,n}(a_{m,n}, T_{m,n})$ and currently preferred is a function that is directly proportional to the quantity of traffic, expressed by the formula of the ratio between the attenuation and the equivalent traffic of the pixel under consideration:

$$R_{m,n} = \frac{a_{m,n}}{T_{m,n}}$$

where:
$a_{m,n}$ is attenuation between pixel m,n and Radio Base Station
$T_{m,n}$ is the equivalent traffic of the pixel m,n.

The computation is performed cell by cell, for each domain and in contention with other domains, and the trajectory to select the pixels to be inserted into the service areas is determined according to increasing values of the sorting variable $R_{m,n}$, thus iteratively adding the traffic contributions of the various pixels to the load factor of the cell until it reaches a pre-set limit $\eta_{lim}$ (typically 0.6-0.7) or until there are no more pixels in the domain.

Figure 4A:
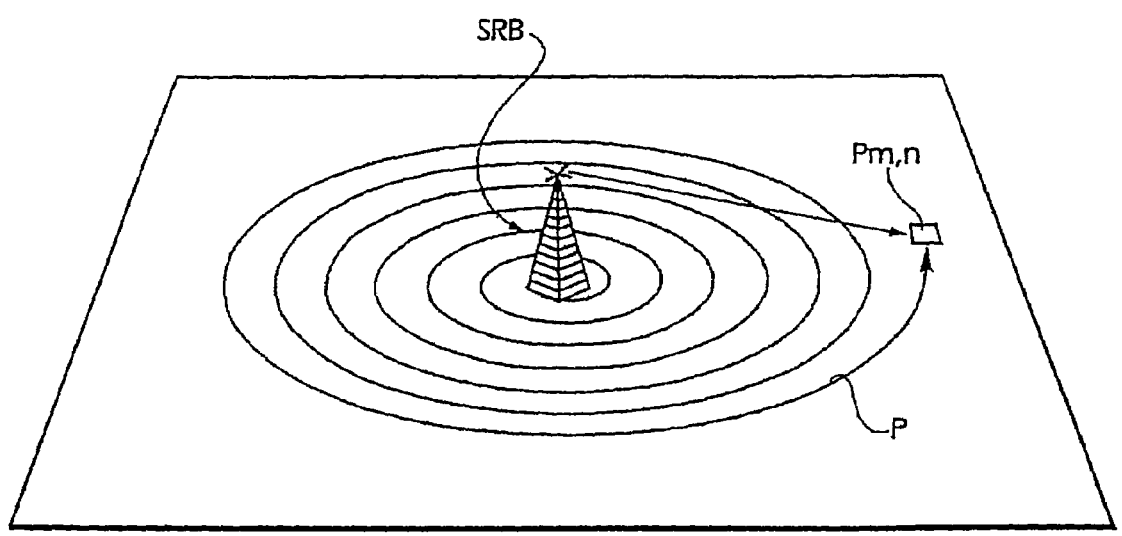
Figure 4B:
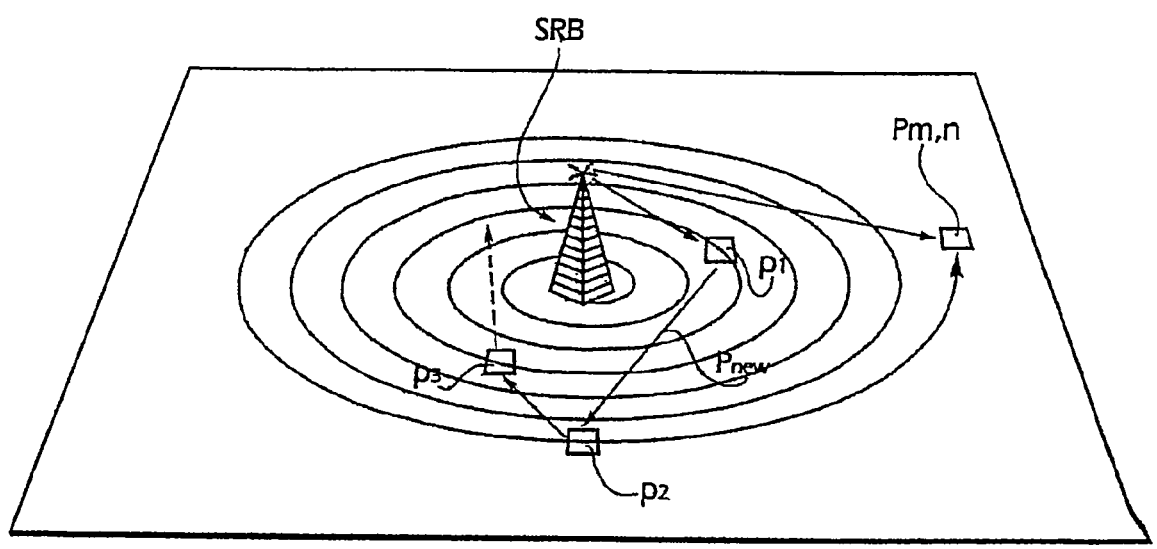

FIGS. 4a and 4b schematically show the sorting criteria with which the pixels of a domain are analysed to be considered or not considered as pixels belonging to a service area, respectively according to the prior art and according to the invention.

In the attenuation plane, the designation SRB indicates the antenna of a Radio Base Station whilst $p_1, p_2, \ldots, p_{m,n}$ indicate the pixels of territory progressively selected according to the predetermined selection criterion.

FIG. 4a refers to a selection criteria according to the prior art, based on electromagnetic attenuation alone, whereby substantially spiralling trajectory P is identified, which originates from the pixel that is electromagnetically "closest" to the Radio Base Station (i.e. from the one with the lowest link attenuation) and proceeds "moving away" towards pixels with greater attenuation.

FIG. 4b instead shows the trajectory $P_{new}$ which can obtained adopting a selection criterion that is a function both of link attenuation and of equivalent traffic. In the attenuation plane said trajectory is represented by a dashed line, shown superposed, for comparison purposes, to the spiral trajectory of the prior art.

With the new selection criterion, the pixels evaluated first in determining cell load are pixels with low attenuation and/or high offered traffic, in accordance with the previous consideration regarding the probability of service request by a pixel. In this way, into the analysis process an element is introduced that closely depends on the time evolution characteristics of the behaviour of an UMTS network, connected in turn to the probability of request for service activated by individual pixels.

Essentially, this determines the introduction, into an essentially deterministic method, of a probabilistic component (the criterion for selecting the pixels as a function of expected traffic implies the assessment of the highest probability that a pixel belongs to the service area), which is a characteristic aspect of Montecarlo-type statistical approach whose main limit, which makes them inapplicable for the desired aims, resides in the poor computational efficiency (longer computation times for planning geographical areas comprising a number of cells that is smaller by at least an order of magnitude).

The result will now be very different from the result that would be obtained using a method according to the prior art unless all pixels have the same offered traffic, condition which is highly unlikely in reality. The innovative method allows to take into account the fact that, in actual behaviour, a cell is overloaded handling the traffic of the pixels that sustain the greatest volume of traffic in that cell.

The function $R_{m,n}$ is the parameter of the sorting metric and it can be defined as a function of variable such as: electromagnetic attenuation between the pixel and the Radio Base Station in consideration, the traffic vector relating to the services present in the network for each pixel, and the related radio electric characteristics which may characterise the services.

The function mentioned as an example is purely indicative, but always considering the equivalent traffic formulation for the pixel m,n set out above, it can be replaced by another relationship, such as:

$$R_{m,n} = \sqrt{\left[\left(\frac{T_{m,n}}{T_{p,q}^{Max}}\right)^2 + \left(\frac{a_{m,n}}{a_{i,j}^{Max}}\right)^2\right]}$$

where the denominators express the normalisation to the maximum value of equivalent traffic belonging to the cell domain $T_{p,q}^{Max}$ and to the maximum value of attenuation belonging to the cell domain $a_{i,j}^{Max}$.

It is also possible for the sorting variable, according to a simplified solution, to be a function of equivalent traffic alone, for example as defined by the relationship:

$$R_{m,n} = \left|\frac{T_{m,n}}{T_{p,q}^{Max}}\right|$$

This case can be applied, for instance, to networks useful for emergency services where it is important to plan the network in such a was to best handle emergency communications, for instance in such a way that each pixel where emergency call activation is more likely is capable of transmitting and/or receiving such communications.

Processing by the system is automatic and the system is able to present the results of the computation graphically on the display 14 of the workstation 10.

The step 324 of checking for outage areas completes the computation of the service areas, verifying pixel by pixel and for each service or family of services that the operative conditions imposed in the simulation for the mobile terminals are assured, considering the actual power class of the terminals.

If the condition is assured (i.e. all pixels of the computed service areas have a power that is compatible with the class of the mobile terminals considered) the method passes to computing macro-diversity areas at step 340; otherwise, the pixels for which said condition is not assured are subtracted from the service area of the cell in question and the method returns to step 322 in which, with a new evaluation cycle, the subtracted pixels can be included in the service area of other cells, for which the condition of compatible uplink power is met.

If the subtracted pixels cannot be included in other cells, they are definitively considered to be part of the outage area.

The method also provides for re-evaluating all pixels changing the input parameters of the block 200, such as offered traffic, number of sites or radio-electrical parameters, computing new service areas on the basis of the new parameters.

The computation of the macro-diversity areas at step 340 is then performed analysing, for each computed service area, the pixels external to that area, but internal to the corresponding domain and verifying whether said pixels can be served according to a macro-diversity mechanism from Radio Base Stations of adjacent cells. In this case, too, the system is capable of graphically presenting the results obtained on the display 14 of the workstation 10.

The definition of such areas is important both because macro-diversity is relevant for the correct operation of CDMA systems (and hence it is necessary to verify its existence), and because the extension of the identified areas has an impact on dimensioning cell apparatuses: a mobile in macro-diversity makes use of resources on all Radio Base Stations with which it is connected.

The block 400 for verifying the dimensioning as executed entails the verification in uplink of the areas in conditions of unavailability or outage due to a lower carrier/interference (C/I) ratio than a determined level. It 400 enables to refine the dimensions of the computed service areas. Said verification block entails a new selection of all pixels in sequence; the considered pixel sequence can be determined as described for the definition of the service areas, so the method of the invention is also applicable to the computation of outage areas. Naturally, the verification is conducted on the pixels of the service areas until all pixels of the service area are selected and verified, discarding any pixels that fail to meet the required C/I condition.

The system then proceeds to the block 500 of refining network planning and dimensioning on the basis of the radio link from the Radio Base Station to the mobile terminals (downlink) according to the data obtained previously.

As can be deducted from the illustrated topics, one of the peculiarities of the present invention consists of its capability of being inserted into a known planning process, as a replacement for one or more blocks or steps of the logic flow of operations, without entailing the need to modify elements upstream or downstream thereof.

This innovative approach can generally also be used in other deterministic methods proposed by the prior art when combining information about traffic distribution and about coverage for the computation of the areas of each cell in which the network is able to provide the services specified on the network to the mobile apparatuses located therein.

The method has been described with reference to the planning of a telecommunication network for mobile radio apparatuses.

Obviously, as will be readily apparent to a person versed in the art, the method described herein is also applicable to the planning of fixed telecommunication networks using a radio interface to connect final users by means of CDMA radio connections.

In particular, the proposed solution is applicable in the case of replacement of wired connections with radio connections.

Naturally, without altering the principle of the invention, the embodiments and construction detail may be varied relative to what is described and illustrated herein purely by way of non limiting example, without thereby departing from the scope of protection of the present invention as defined in the appended claims.

The invention claimed is:

1. A method for planning a telecommunication network for radio apparatuses including a plurality of cells distributed over a geographical area by considering time-dependent characteristics of the network, wherein each cell comprises a set of elementary pixels adapted to receive a radio signal irradiated by a fixed radio base station, the method comprising:

determining for each cell a service area comprising the location of the pixels of the cell in which the network, on the basis of a pre-set limit value ($\eta_{lim}$) of a cell load factor ($\eta$), is able to provide predetermined services to the mobile apparatuses located therein;

identifying a selection sequence in time of the pixels belonging to the service area pertaining to a pre-set cell according to a criterion for selection in succession, wherein the criterion for selection in succession is based on the values of a sorting function ($R_{m,n}$) which is a function of at least the quantity of traffic ($T_{m,n}$) pertaining to the pixel being examined; and computing the service area as a set of the pixels of the cell that are in succession selected so that the sum of the contributions due to each pixel does not exceed the pre-set limit value ($\eta_{lim}$) of the cell load factor ($\eta$).

2. The method as claimed in claim 1, wherein said sorting function is a function ($R_{m,n}$) of the value of electromagnetic attenuation ($a_{m,n}$) between the fixed radio base station of the pre-set cell and the pixel being examined, and of the quantity of traffic ($T_{m,n}$) pertaining to the pixel being examined.

3. The method as claimed in claim 1, further comprising computing macro-diversity areas in which, for each service area previously calculated, a verification is made as to whether the pixels outside said area, but in which the signal irradiated by the fixed radio base station is received with a power exceeding a predetermined threshold can be served by radio base stations of adjacent cells.

4. The method as claimed in claim 1, further comprising determining the areas in unavailability or outage conditions, by considering pixels belonging to the service area according to a criterion for selection in succession determined by said sorting function ($R_{m,n}$).

5. The method as claimed in claim 1, wherein the pixels belonging to the service areas are selected starting from the location of the pixels in which the signal irradiated by the fixed radio base station is received by a mobile apparatus with a power exceeding a predetermined threshold in such a way that it can be recognised and decoded.

6. The method as claimed in claim 1, wherein the information about traffic distribution over the territory is computed starting from a plurality of predetermined values of traffic offered for each service per pixel ($T_{m,n,i}$) according to a relationship which, for each pixel, assigns a corresponding value of equivalent traffic ($T_{m,n}$) as a function of variables that are representative of the characteristics of the radio connection.

7. The method as claimed in claim 6, wherein the value of equivalent traffic ($T_{m,n}$) for one pixel is computed according to the relationship:

$$T_{m,n} = \frac{1}{B_0} \sum_{i=0}^{S-1} B_i \cdot T_{m,n,i}$$

where:

S is the total number of services, $B_o$ is the bit rate of the service at the lowest speed, $B_i$ is the bit rate of the $i^{th}$ service present in the pixel m,n, and $T_{m,n,i}$ is the traffic offered in the pixel m,n for the $i^{th}$ service.

8. The method as claimed in claim 6, wherein said sorting function ($R_{m,n}$) is a function that is directly proportional to the value of electromagnetic attenuation ($a_{m,n}$) of the pixel and inversely proportional to the quality of traffic ($T_{m,n}$) of the pixel, according to the formula:

$$R_{m,n} = \frac{a_{m,n}}{T_{m,n}}$$

where:

$a_{m,n}$ is the attenuation between pixel m,n and radio base station and $T_{m,n}$ is the equivalent traffic of the pixel m,n and the selection of the pixels belonging to the service area takes place according to a succession determined by increasing values of said function ($R_{m,n}$).

9. The method as claimed in claim 6, wherein said sorting function ($R_{m,n}$) is expressed according to the formula:

$$R_{m,n} = \sqrt{\left[\left(\frac{T_{m,n}}{T_{p,q}^{Max}}\right)^2 + \left(\frac{a_{m,n}}{a_{i,j}^{Max}}\right)^2\right]}$$

where:

$a_{m,n}$ is the attenuation between pixel m,n and radio base station, and $T_{m,n}$ is the equivalent traffic of the pixel m,n, the values of attenuation ($a_{m,n}$), and of equivalent traffic ($T_{m,n}$) per pixel being normalised to the maximum value of equivalent traffic and to the maximum value of attenuation of the cell.

10. The method as claimed in claim 6, wherein said sorting function ($R_{m,n}$) is expressed according to the formula:

$$R_{m,n} = \left| \frac{T_{m,n}}{T_{p,q}^{Max}} \right|$$

where:

$T_{m,n}$ is the equivalent traffic of the pixel m,n, normalised to the maximum value of equivalent traffic of the cell.

11. The method as claimed in claim 1, wherein the load factor ($\eta$) of a cell is defined as the ratio between a predetermined acceptable load of the cell and the maximum load in correspondence with which instability arises, according to the relationship $$\eta = \sum_{i=1}^{S} n_i \cdot SAF_i \cdot (1 + f_i) \cdot SNR_i$$

where:

S is the total number of services;

$n_1$ is the maximum number of users simultaneously active in the cell for the $i^{th}$ service;

$SAF_i$ is the service activity factor of the $i^{th}$ service;

$f_i$ is the ratio between intracell interference and intercell interference; and $SNR_i$ is the signal/noise ratio for the $i^{th}$ service.

12. A computer readable medium encoded with a computer program product executable by at least one computing system, and directly loadable into an internal memory of a computer, the computer program product comprising software code portions for the implementation of a method capable of planning a telecommunication network for radio apparatuses as claimed in any one of claims 1-11.

* * * * *

UNITED STATES PATENT AND TRADEMARK OFFICE
CERTIFICATE OF CORRECTION

PATENT NO. : 7,640,018 B2
APPLICATION NO. : 10/578502
DATED : December 29, 2009
INVENTOR(S) : Francalanci et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this

Ninth Day of November, 2010

David J. Kappos
*Director of the United States Patent and Trademark Office*